Oct. 12, 1965 R. JOHNSON 3,211,474
WIRING DUCT OUTLET OR THE LIKE
Filed April 17, 1961

INVENTOR
Robert Johnson

BY
his ATTORNEYS

United States Patent Office 3,211,474
Patented Oct. 12, 1965

3,211,474
WIRING DUCT OUTLET OR THE LIKE
Robert Johnson, Edgeworth Borough, Pa., assignor to H. K. Porter Company, Inc., Pittsburgh, Pa., a corporation of Delaware
Filed Apr. 17, 1961, Ser. No. 103,660
2 Claims. (Cl. 285—205)

This invention relates to an outlet for a wiring duct or the like comprising an insert of selected height which can be preset, or installed at the site, and provide a service connection with a curved pulling surface of appropriate radius for conductors or other elongated members to be passed through said connection, without deformation of said duct or the like. More particularly, this invention pertains to a wiring system outlet of a kind which may be used in wall, ceiling or underfloor conductor ways in which one or more inserts for an outlet or the like can be installed at any selected location and clamped to an appropriate opening made in the wiring duct to form an integral part of the system with advantages enumerated above.

In prior underfloor wiring systems, for example, outlets were provided in ductways for wiring systems which in some cases were flared deforming the edge of the duct opening for the outlet fitting which then was crimped in place around that edge; and, in other practices, a crimping practice was provided without deformation of the duct opening edge which yielded angled bend for conductors to be pulled contrary to recommended practice in the electrical wiring field.

Such deficiencies have been overcome by new constructions made in accordance with this invention and other objects, features and advantages of this invention will be apparent from the following description and the accompanying drawings, which are illustrative only, in which FIGURE 1 is a plan view of a portion of a duct used in a wiring system in which a hole had been cut to provide an opening in which an insert has been fixed to provide an outlet for a service fitting;

Figure 1:
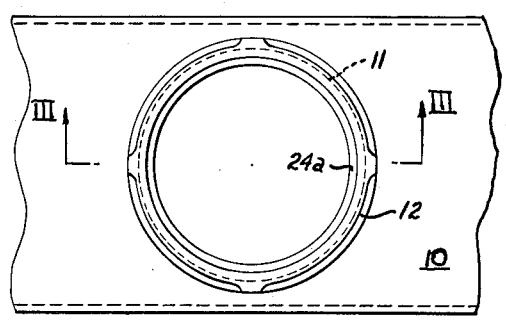
Figure 2:
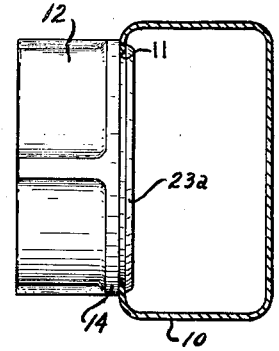
FIGURE 2 is an end view of the construction shown in FIGURE 1.

Referring to the drawings, a portion of a duct 10 of conventional nature is shown which may be utilized in any appropriate wiring system such as an underfloor wall or ceiling system. It has a circular opening 11 in the top thereof, which may be cut in the factory when the outlet location is predetermined and the outlet inserts are present before shipment. On the other hand, there is often need after the ductwork is laid for a wiring system at the site of installation, for an opening such as opening 11, to be cut on the site at the desired location in the duct for the required service. Such an opening may be made by the installing workman with the aid of a conventional outlet cutting tool. Under the instant invention, either at the factory or site, an insert 12 of this invention is selected of the desired height to cooperate with the duct and opening where such an outlet is to be located. Generally, there will be several outlets along each length of duct which usually is made in standard sizes and lengths.

Insert 12 initially comprises a blank in the form of a hollow right-circular cylindrical member with a peripheral wall 13 integral with a base portion 14. The inner surface of the wall from top 15 to base 14 is tapped so as to provide a female threaded surface with, e.g., standard straight single pipe threads 16. After the outlet is finished it may be closed with a removable cap 17 to be left in place during the concreting of the duct in place. Generally, a unitary outlet comprising duct opening 11 and member 12 fixed therein will be high enough so that top 15 will be generally flush with the surface of the concrete. Thereafter cap 17 may be removed and the desired service fitting installed by engagement of the threads thereon with thread 16 to hold the fitting securely in place. After cap 17 has been removed and before such fitting is installed, it is desirable to pull conductors in the desired direction through the hollow center of the fitting coupling 12 in order to provide appropriate wiring for the intended service. In the pulling of conductors, or other elongated members, whether for telephone, signal, or other services, abrupt bending of the conductors or other elongated members is to be avoided and many electrical codes specify that a radius of 0.375 of an inch be provided around which such pulling is to be made. Additionally, to remove sharp edges which otherwise might encounter such a conductor, the inner edge of the top 15 may be chamfered at 18 and the outer edge rounded somewhat at 19.

Figure 3:
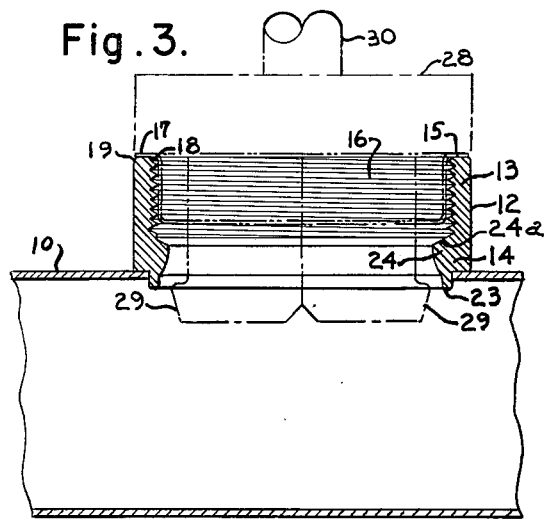
FIGURE 3 is a view in section taken along line III—III of FIGURE 1 with the insert blank in place and a tool schematically illustrated for clamping it to the edge of the duct opening to provide an integral outlet construction of this invention.
Figure 4:
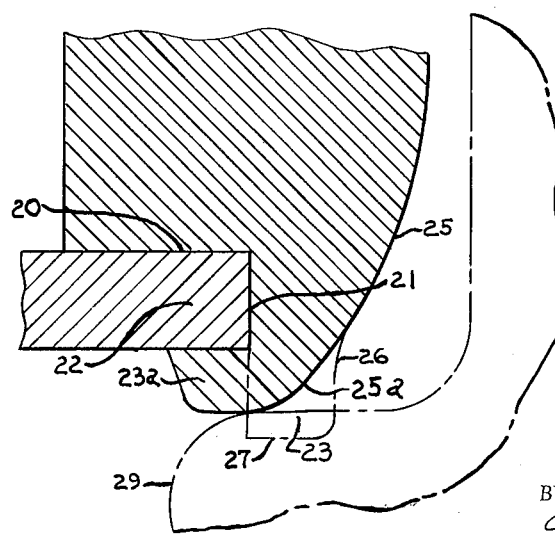
FIGURE 4 is an enlarged view of a portion of the joint area between insert and duct illustrating the completion of the clamping deformation of the insert blank and the continuous convex curve provided for proper pulling of conductors or other elongated members through the outlet.

Base 14 of the insert 12 is provided with an external rabbet which forms an undercut portion comprising a horizontal downwardly facing annular seat 20 and a radially inward outwardly facing cylindrical vertical face 21. The lower part of base 14 of the blank is a pendent cylindrical flange 23 which is readily deformable to clamp edge 22 of the duct metal defining opening 11 after insert 12 is seated on edge 22 with flange 23 extending into opening 11, serving to register the center of opening 11 with the axis of the insert blank. The inside of base 14 is provided with an internal peripheral boss 24 having a generally continuous convex surface 25 which swells upwardly and inwardly from the lower portion of flange 23 to an upwardly and outwardly sloping surface 24a extending to the lowest thread 16. The inner portion of flange 23 when undeformed is provided with a surface 26 in generally reverse curve relation to surface 25, such surface 26 extending for approximately one-half of the distance between bottom 27 of flange 23 and seat 20. FIGURE 3 illustrates insert 12 undeformed in full seated position before the clamping thereof to the duct 10, while the detail view in FIGURE 4 shows in solid line cross-section the insert flange 23 deformed to fix insert 12 to edge 22 to complete the integral outlet. Insert 12 may be made of any suitable material; as shown, it is made of a zinc-containing die-casting metal, cast to finish dimensions.

The thickness, ductility and strength of the material of which insert 12 is made is such that the lower end of flange 23 may readily be bent into clamping position by a spinning tool 28 illustrated in FIGURES 3 and 4 to move the portion of flange 23 shown in chain line outline in FIGURE 4 to the solid line position thereof in that figure as arms 29 are moved radially outwardly by shaft 30. After insertion of the tool in collapsed position as shown in FIGURE 3 to enable it to be moved into position past thread 16 and boss 24, the radial extension and rotation of arms 29 spins the lower part of flange 23 and clamps the peripheral edge 22 of opening 11 between seat 20 and the displaced edge 23a.

After the bending of edge 23 is completed, tool 28 is collapsed and withdrawn upwardly from the interior of outlet 12. Generally, the pressure on the head of tool 28 resting on top 15, will be sufficient to hold insert 12 against rotation during the spinning action when the edge 23a is bent into clamping position to complete the conversion of insert 12 into an outlet fitting, integrally joined to duct 10 with which it cooperates. Other appropriate manual or mechanical means may be provided for turning the bead edge 23a into clamping position relative to edge 22 and seat 20 around the entire periphery of insert 12 and opening 11.

The bending of the lower edge of flange 23 causes the inner surface thereof to move into flush alignment with swelling surface 25, as shown at 25a to complete a substantially continuous convex vertical curve intercepting an arc approaching 90° with a mean radius of sufficient size, such as 0.375 of an inch, suitable for the pulling of conductors past boss 14 and through the interior in outlet 12 without too abrupt bending or turning, the surface 25–25a further acting to hold the conductors or other elongated members being pulled generally away from threads 16.

Figure 5:
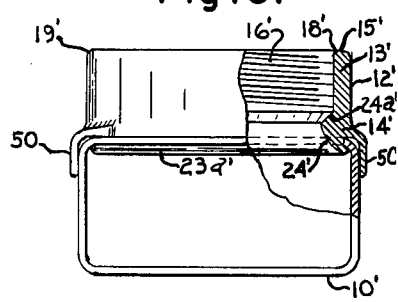
FIGURE 5 is a view in cross section through a modified duct outlet embodiment of this invention.
Figure 6:
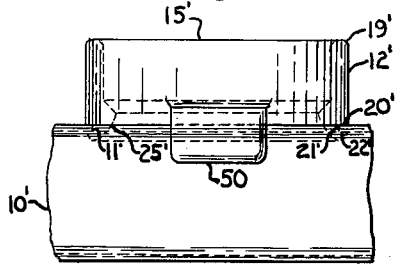
FIGURE 6 is a side view of the modified embodiment.

A modified embodiment is illustrated in FIGURES 5 and 6, the respective parts of which are provided with the same reference numerals, with the addition of a prime accent thereto, relative to parts in the embodiment of FIGURES 1 to 4 corresponding generally in construction and functioning thereto. Thus, insert 12' is applied to an opening 11' in duct 10' in the same manner that insert 12 is applied to duct 10 to make an outlet combination. However, insert 12' is provided with downwardly turned integral ears 50 radially outwardly of base 14' at the respective ends of a diameter through the axis of the insert at right angles to the length of duct 10'. Such ears 50 may be utilized whenever it is desired to insure that there will be no rotation of insert 12' during the bending of edge 23a' to clamping position and such ears may also serve to bridge any space which may exist in the upper corner radius of duct 10' in cases where the opening 11' is larger than the width of the flat top surface portion of duct 10' exclusive of the radius corners of duct 10'.

In the foregoing description, it will be understood that orientation terms such as "top," "bottom," "horizontal," "vertical," "upper" and "lower," and others, are relative only because constructions of this invention may be utilized in any position in space. Various modifications may be made in details of the embodiment shown and other embodiments provided without departing from the spirit of this invention or the scope of the appended claims.

I claim:

1. A duct outlet or the like comprising in combination a duct member having at least one generally circular opening therein, and an insert disposed in alignment with said opening and fixed to the peripheral edge thereof, said insert comprising a one-piece hollow generally cylindrical member having an outer wall terminating in a downwardly facing annular shoulder and an inner wall including a threaded portion, the latter extended downwardly toward, but terminating above the duct opening, said inner wall further including an annular boss member disposed in a relative position above the shoulder and below the threaded portion of said inner wall, said boss member extending inwardly toward the center axis of the insert and having a diameter substantially less than that of said threaded portion, said boss being defined by an inwardly sloping generally conical upper surface and an outwardly curved bottom surface facing downwardly toward the duct, said surfaces merging in a blunted annular junction defining the minimum diameter of interior of the insert, said insert further including an annular pendant portion extending downwardly within said duct and expanded by lateral pressure into underlying relation with respect to the said downwardly facing annular shoulder, the peripheral edge of the duct being clamped firmly between the said shoulder and said expanded portion to prevent relative rotation of the insert with respect to said duct, the inner surface of pendant portion defining a smooth curving surface from its annular peripheral edge within the duct and extending inwardly toward and merging with the curved surface defining the bottom surface of said boss.

2. An insert for a wiring duct outlet or the like, comprising, in combination, a hollow cylindrical insert having a peripheral wall, said wall being threaded downwardly from the upper edge thereof, a base portion forming the lower part of said wall with an external peripheral right angle under cut portion adapted to seat on an annular edge of an opening in a duct or the like, said portion having a downwardly facing generally horizontal annular seat in vertical alignment with said wall and a cylindrical outward face radially inwardly of said horizontal annular seat, an internal boss extending peripherally around the inside of said base having an inside diameter smaller than the inside diameter of said wall, said boss having an upwardly and inwardly swelling convex surface conducive to the pulling of conductors through said outlet or the like with said surface in guiding engagement relative to said conductors, the major portion of said boss being above said annular seat, the lower edge of said boss being readily deformable and pendent, said lower edge having its inside and outside surface continuation of the surfaces of said boss and cylindrical outward face respectively and being radially outwardly of the inward projection of said boss and further being deformable outwardly in situ in said duct or the like by pressure to engage and clamp the edge of said opening between said horizontal annular seat and deformed lower edge sufficiently tightly to substantially prevent rotation between said insert and said edge of said opening, and integral diametral outwardly and downwardly extending ears on said insert adapted to cover the upper corner radius of said duct or the like relatively close to each side thereof and of said opening.

References Cited by the Examiner

UNITED STATES PATENTS

| | | | |
|---|---|---|---|
| 463,805 | 11/91 | McQueen | 285—202 |
| 697,051 | 4/02 | Whiton | 285—205 |
| 749,391 | 1/04 | Lutz | 285—424 |
| 899,906 | 9/08 | Ritter | 285—205 |
| 917,328 | 4/09 | Lutz | 285—129 |
| 1,773,811 | 8/30 | Flachbarth | 285—129 |
| 1,882,021 | 10/32 | Lauer | 285—203 |
| 1,982,464 | 11/34 | Buchanan | 285—205 |
| 2,016,284 | 10/35 | Knight | 285—129 |
| 2,260,149 | 10/41 | Meek | 285—202 |
| 2,950,837 | 8/60 | Christensen | 285—129 |

References Cited by the Applicant

UNITED STATES PATENTS

| | | |
|---|---|---|
| 2,048,755 | 7/36 | Reichert. |
| 2,768,008 | 10/56 | Rheem. |

CARL W. TOMLIN, *Primary Examiner.*

UNITED STATES PATENT OFFICE
CERTIFICATE OF CORRECTION

Patent No. 3,211,474                                    October 12, 1965

Robert Johnson

It is hereby certified that error appears in the above numbered patent requiring correction and that the said Letters Patent should read as corrected below.

Column 4, line 35, for "surface continuation" read -- surfaces continuations --.

Signed and sealed this 7th day of June 1966.

(SEAL)
Attest:

ERNEST W. SWIDER                                    EDWARD J. BRENNER
Attesting Officer                                         Commissioner of Patents